Patented Sept. 4, 1945

2,384,124

UNITED STATES PATENT OFFICE 2,384,124

UNSATURATED ESTERS AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application March 7, 1942, Serial No. 433,831

9 Claims. (Cl. 260—78)

This invention relates to a new group of unsaturated esters having valuable properties as hereinafter described. The new esters contain at least one terminal group derived from an unsaturated monohydric alcohol and at least one terminal group derived from an unsaturated monobasic acid. The new esters are esters of carbonates which have free acid and hydroxyl groups and have an ester linkage between an hydroxy group and an acid group. By "ester linkage" we mean a coupling oxygen atom derived by reaction of an alcohol with a carboxylic or an inorganic acid. Thus, the carbonate $$R_1\text{—}O\text{—}CO\text{—}O\text{—}R_2$$

contains two ester linkages.

Common chemical nomenclature and terminology has been used when possible. Frequently, however, chemical expressions may have several accepted meanings. It is therefore necessary to define the scope of these ambiguous expressions which must be necessarily used to describe the invention.

The expression "polyacidic compound" has been used herein in the generic sense to include all compounds having two or more inorganic OH or carboxylic acid groups and which do not contain a free alcohol type of hydroxyl group. The expression is intended to include simple polybasic inorganic acids such as boric, silicic, carbonic, sulphuric, or phosphoric acids, the simple polycarboxylic acids such as oxalic, adipic, succinic, maleic, fumaric, tricarballylic, phthalic, diphenyldicarboxylic or naphthalic acids, the simple heterocyclic acids such as quinolinic, cinchomeronic, ethylene oxide -α, α-dicarboxylic, or cotarinic acids, or the simple ether acids such as diglycolic or dilactic and the corresponding thioether acids or methoxy succinic acids. It is also intended to include the more complex ester acids which contain ester linkages such as glycolyl acid malonate $$HOOC\text{—}CH_2\text{—}O\text{—}CO\text{—}CH_2COOH$$

ethylene bis (acid sulphate)

$$HO\text{—}SO_2\text{—}O\text{—}C_2H_4\text{—}O\text{—}SO_2\text{—}OH$$

the acid carbonate of lactyl lactic acid

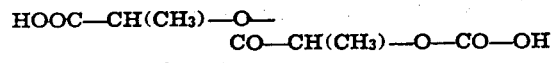
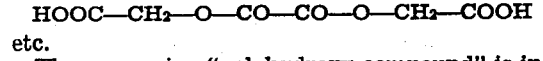

diglycolyl oxalate $$HOOC\text{—}CH_2\text{—}O\text{—}CO\text{—}CO\text{—}O\text{—}CH_2\text{—}COOH$$

etc.

The expression "polyhydroxy compound" is intended to be generic to all compounds having two or more hydroxyl groups which do not have any free acid groups. The hydroxy groups must obviously not be attached directly to carbonyl groups. The expression includes the simple polyhydroxy alcohols such as ethylene glycol, propylene glycol, butylene glycol, trimethylene glycol, pentamethylene glycol, glycerine, methyl-glycerol, erythritol, or pentaerythritol; the sugars such as glucose, lactose, sucrose, or maltose; the polymers of polyhydroxy alcohols such as di-, tri-, and tetraethylene glycol, di-, tri-, and tetrapropylene glycol, the polybutylene glycols, polyglycerols, etc.; and the cyclic polyhydroxy compounds such as pyrogallol, hydroquinone, 2,5-bis (hydroxymethyl) furan, 3,5-dihydroxycoumarone, dioxanediols, or p,p-dihydroxy-diphenyl ether. The expression also includes the polyhydroxy esters such as ethylene dilactate, $$CH_3\text{—}CHOH\text{—}CO_2\text{—}C_2H_4\text{—}CO_2\text{—}CHOH\text{—}CH_3$$

bis (hydroxyethyl) carbonate $$(HO\text{—}C_2H_4)_2\text{—}CO_3$$

glycol monoglycolate $$HO\text{—}C_2H_4\text{—}O\text{—}CO\text{—}CH_2OH$$

or diethylene glycol bis (hydroxyethyl carbonate $(HOC_2H_4\text{—}CO_3\text{—}C_2H_4)_2O$.

The expression "hydroxy acid" is used in the broad sense to include all compounds having both acidic groups and alcoholic hydroxyl groups. The generic expression includes aliphatic hydroxy acids such as citric, hydroxy butyric, tartaric, leucinic, saccharic, hydroacrylic, malic, ricinoleic, acetonic, glyceric, lactic and glycolic acids, the aromatic hydroxy acids such as salicylic, gallic, resorcylic, phloritic, and coumaric acids, and the heterocyclic hydroxy acids such as berberonic, alpha-furyl glycolic and 3-hydroxy-coumarone carboxylic (2) acid

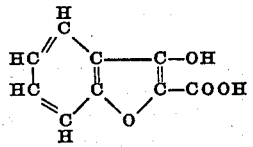

The generic expression "hydroxy acids" also includes the ester hydroxy acids including theoretical acids such as hydroxyethyl carbonate $$HO\text{—}C_2H_4\text{—}CO_2\text{—}OH$$

lactyl lactic acids $$CH_3\text{—}CHOH\text{—}CO_2\text{—}CH(CH_3)COOH$$

and 2-(hydroxyethyl) ethyl carboxymethyl carbonate

or glycol monoacid sulphate

It is necessary to differentiate between compounds which contain ester linkages between the reactive groups of the compound which separate the unsaturated alcohol radicals of the ultimate esters and those which do not. Accordingly, the expression "polyacidic ester" has been used herein to refer to the class of polyacidic compounds which contain at least one ester linkage between a pair of acid groups. They, of course, contain at least two reactive acidic groups and may not contain reactive alcoholic hydroxy groups. The expressions "simple polyacid" or "simple polybasic acid" are used to denote compounds of more simple structure having no ester linkages in the molecules between the acid groups. Similarly, the expression "polyhydroxy ester" includes the compounds having at least two alcoholic hydroxy groups and no reactive acidic groups but which also contains at least one ester linkage between a pair of hydroxyl groups. The simple polyhydroxy compounds are acid-free compounds in which the hydroxyl groups are not separated by an ester linkage and the simple hydroxy acids are compounds containing acid and hydroxyl groups which are not separated by an ester linkage. These simple compounds, may, however, contain more stable, less easily hydrolyzed groups such as ether or thioether groups. The compounds herein contemplated in some cases may also contain tertiary amino groups although it is preferred that the composition be nitrogen free since such products possess greater stability and yield polymers which are more stable and have other characteristics which render them more desirable than nitrogenous compounds.

For example, the compound derived by reacting allyl lactate with phosgene has the following probable structure:

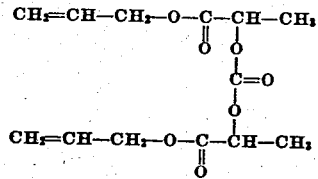

and may be considered to be an allyl ester of the polyacidic compound

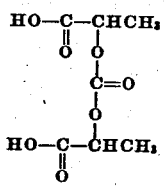

However, since this acid contains ester groups between the acid groups, it is not a simple polyacidic compound but is a polyacidic ester. Additionally, however, the above allyl ester may be regarded as a partial ester of the simple polyacid carbonic acid and allyl alcohol. Oxalic, malonic, or diglycolic acids are simple polyacidic compounds. Likewise, glycol, diethylene glycol, or glycerol, etc., are simple polyhydroxy compound and lactic, ricinoleic and glycolic acid are simple hydroxy acids.

It will be apparent that many of the acids, hydroxy compound, and hydroxy acids contemplated within the above definitions may not exist as such in the free state and, consequently, may be theoretical compounds. Since their esters may be prepared, however, it is often convenient to regard such esters as esters of such theoretical acids.

The new unsaturated esters contain at least one terminal group which is the radical of an unsaturated alcohol which preferably has two to five carbon atoms and an unsaturated linkage in an aliphatic chain such as esters of vinyl, allyl, methallyl, crotyl, isocrotyl, isopropenyl, propargyl, methylpropargyl, methylvinylcarbinyl, tiglyl, ethylallyl, butadienyl, divinyl carbinyl, or angelyl alcohols, or the halogen, substituted products of the above alcohols such as 2-chloroallyl, 2-bromoallyl, or chlorocrotyl alcohols. Although the esters of the lower molecular alcohols are preferred, those having from six to ten carbon atoms are also useful, for example, esters of 2-hexene-1-ol, phenyl propargyl alcohol, linalool, cinnamyl alcohol, vinylbutylcarbinol, and 2-4-hexadiene-1-ol.

The new compounds are also esters of unsaturated monobasic acids, preferably those containing three to five carbon atoms such as acrylic, crotonic, methacrylic, α-ethylacrylic, propiolic, tetrolic, pentinoic, and the halogen substituted acids such as alpha or beta-chloracrylic, alpha or beta bromacrylic, or chlorocrotonic acids. Esters of unsaturated acids having more than five and up to ten carbon atoms are also useful, for example, cinnamic, phenylpropiolic, etc., acids may be prepared.

The compounds are esters of an ester hydroxy acid in which at least one hydroxy group is esterified with an unsaturated monobasic acid and at least one acid group is esterified with an unsaturated monobasic alcohol, and the ester hydroxy acid being an ester of carbonic acid. The carbonate ester may have hydroxy groups esterified with saturated acid such as acetic, propionic, butyric, or stearic acids and/or it may have free unreacted hydroxy groups. The carbonate ester may have acid groups esterified with a saturated alcohol such as methyl, butyl, ethyl, or lauryl alcohols and/or it may have free unreacted acid groups.

The new esters contain at least three ester linkages in a single chain, two of which are derived from carbonic acid. In general, the simpler esters contain no more than six ester linkages in a single chain. However, esters containing up to ten ester linkages in a chain are contemplated.

Two general modifications of esters may be prepared. The first modification may be regarded as an ester of (a) an acid ester of carbonic acid and an unsaturated alcohol containing at least three carbon atoms and (b) an hydroxy ester which is a partial ester of a polyhydroxy compound and an unsaturated acid such as ethylene glycol monoacrylate. The second modification may be regarded as a mixed ester of carbonic acid wherein one acid group thereof is esterified with an hydroxy ester which is a partial ester of a polyhydroxy compound and a unsaturated acid and the second acid group is esterified with an hydroxy ester which is an unsaturated alcohol ester of an hydroxy acid such as allyl lactate. Preferably, monohydroxy esters are utilized since it is desired to secure relatively simple compounds rather than resinous compositions.

Preferably, the unsaturated carbonate esters contain a pair of unsaturated groups and the carbonate radical is located in a linear chain between an unsaturated acid radical and an unsaturated alcohol radical. Thus, one acid group of the carbonic acid is esterified with either an unsaturated alcohol or the hydroxy group of hydroxy ester containing as a terminal group, the radical of the unsaturated alcohol, while the other acid group of the carbonic acid is esterified with the hydroxy group of an hydroxy ester containing as a terminal group the radical of an unsaturated monobasic acid. Such esters are termed polyunsaturated esters.

There are three simple types of the monohydroxy ester containing the unsaturated monobasic acid radical. The first is the ester of a simple hydroxy compound with the unsaturated monobasic acid. These compounds such as glycol monoacrylate, diethylene glycol monoacrylate, glycerol diacrylate, propylene-glycol monoacrylate, resorcinol monoacrylate, etc., and the corresponding methacrylate, crotonates, tiglates, etc., may be prepared by direct partial esterification in the presence of a polymerization inhibitor such as hydroquinone or pyrogallol.

Another type of hydroxy ester of unsaturated monobasic acid is that in which an hydroxy group of a simple hydroxy acid is esterified with the unsaturated acid and an acid group of the hydroxy acid is esterified with one or a portion of the hydroxy groups of a simple polyhydroxy compound. Examples of this type of ester are glycol-α-methacryloxypropionate, glycol monomethacryloxyacetate, glycerol bis (methacryloxypropionate), glycol -α-β-dimethacrylpropionate. These may be prepared by partial esterification of the simple hydroxy compound with halo-substituted carboxylic acid which esters are then treated with the silver salt of the unsaturated monobasic acid. The same esters may be prepared by esterifying the unsaturated acid with a simple monohydroxy acid and then treating the acid ester with ethylene oxide or propylene oxide in the presence of a polymerization inhibitor.

Other hydroxy esters of unsaturated monobasic acids are those in which one hydroxy group of a simple polyhydroxy compound is esterified with a simple monohydroxy carboxylic acid and at least one hydroxy group of the simple polyhydroxy compound is esterified with an unsaturated monobasic acid, for example, glycol-monomethacrylate monolactate, glycerol dimethacrylate-monolactate, bis (β-methacryloxyethyl) maleate, tris (β-methacryloxymethyl) citrate, etc., and the corresponding acrylates, crotonates, cinnamates, etc., and the corresponding compounds of propylene-glycol, diethylene-glycol, trimethylene-glycol, triethylene-glycol, etc. These may be prepared by esterifying an unsaturated monobasic acid with a chlorhydrin and then treating the reaction product with a silver salt of a simple hydroxy acid. They may also be prepared by partially esterifying a simple polyhydroxy compound with unsaturated acid in the presence of a polymerization inhibitor and subsequently reacting the hydroxy ester thus produced with an acid chloride of a simple hydroxy acid.

The above hydroxy esters of unsaturated monobasic acids may be reacted with a chloroformate of an unsaturated alcohol made by reaction of phosgene on the alcohol at a temperature below 20° C. to form compounds of the first modification. The chloroformates may be added to a mixture of the hydroxy ester and an alkaline reagent such as pyridine or other tertiary cyclic amine or an oxide, hydroxide, or carbonate of an alkali or alkaline earth metal to produce the new unsaturated esters. In many cases, the hydroxy ester may be treated with phosgene, preferably at temperatures between 0 and 20° C. to produce the corresponding chloroformate which may then be reacted with an unsaturated alcohol to produce the same new esters. For example, glycol monomethacrylate may be reacted with allyl chloroformate to form the compound

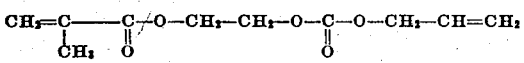

As previously noted, other esters which are mixed esters, of carbonic acid, an hydroxy ester terminated by an unsaturated alcohol radical and an hydroxy ester terminated by an unsaturated acid radical, may be prepared. Various hydroxy esters containing unsaturated alcohol radicals may be used. Thus, monohydroxy esters of simple hydroxy acid and unsaturated monohydric alcohol, for example, allyl lactate, allyl methyl malate, diallyl malate, tri-allyl citrate, allyl salicylate, allyl glycolate, allyl ricinoleate, allyl hydroxy butyrate, etc., and the corresponding methallyl, crotyl, vinyl and other unsaturated alcohol esters are suitable. These esters may be prepared by direct esterification of the simple monohydroxy acid with the unsaturated alcohol.

Other more complex monohydroxy esters of unsaturated alcohols such as glycol mono (allyl carbonate), glycerol bis (allyl phthalate), glycol mono (allyl adipate), and the corresponding compounds of diethylene glycol, dipropylene glycol, triethylene glycol, resorcinol, etc., and the corresponding methallyl, crotyl, tiglyl, etc., esters may be prepared by partially esterifying a simple polybasic acid with an unsaturated alcohol and then subsequently treating the resulting acid ester with ethylene oxide or propylene oxide. These hydroxy compounds may also be prepared by reacting a chlorhydrin with a silver salt of an acid ester of unsaturated alcohol and a polybasic acid.

The monohydroxy esters of an unsaturated alcohol may be converted to the chloroformates by reaction with phosgene and then reacted with monohydroxy esters of an unsaturated monobasic acid. Alternatively, the monohydroxy ester of unsaturated monobasic acid may first be treated with phosgene and subsequently reacted with the monohydroxy ester of unsaturated alcohol.

For example, allyl lactate may be reacted with phosgene at 0 to 10° C. to form the chloroformate. Thereafter, the chloroformate may be reacted with glycol monoacrylate in the presence of pyridine, sodium, calcium or barium carbonate, oxide, or hydroxide or other suitable alkaline agent to form the ester

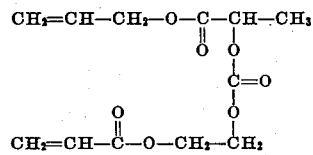

Other esters of similar structure may be prepared in like manner.

The new unsaturated esters are true chemical compounds having distinct melting and boiling points. A compound will always have a uniform small number of ester linkages between an unsaturated alcohol and unsaturated monobasic acid radicals. Usually six or fewer ester linkages and rarely more than ten will exist in a single monomeric molecule. The compounds are therefore readily distinguishable from the alkyd resins which may contain a very great number of ester linkages within a single molecule and which number is never uniform for any composition of alkyd resin.

The unsaturated esters described herein are generally high boiling liquids some of which are capable of being distilled at reduced pressures. Other esters are solid at normal temperatures. Most of the liquid esters are clear, colorless, and miscible with numerous organic solvents such as alcohol, chloroform, acetone, dioxane, benzene, xylene, toluene, diethyl ether, paraffin hydrocarbons, etc. The monomeric esters are very valuable as plasticizers for various resin materials such as styrene, cellulose, vinyl, urea, protein, phenolic, or acrylic resins. Other uses such as solvents, insecticides, and liquid coating compositions are noteworthy.

An important use of the new compounds involves their polymerizability in the presence of heat or light to yield solid or liquid compositions of widely different physical properties. The polymerization is preferably conducted in the presence of catalysts such as oxygen, ozone, or organic peroxides such as lauryl, benzoyl, and acetone peroxides.

The products of polymerization vary greatly in their physical properties, depending upon the molecular structure of the monomer as well as upon the extent of polymerization. In general, the polymers are transparent, and colorless, and upon complete polymerization, a resin which is substantially insoluble and infusible at atmospheric pressure is produced. On the other hand, the monounsaturated ester generally polymerizes to form a fusible polymer which is soluble in solvents such as acetone, benzene and xylene. A range of resins from hard, brittle products to soft, flexible materials is secured. In the ultimate state of polymerization, the compositions derived from polyunsaturated esters which contain at least two polymerizable unsaturated groups which are unconjugated with respect to carbon are substantially unaffected by acids, alkalies, water, and organic solvents. Intermediate polymers derived from these polyunsaturated esters having a wide range of properties may be secured. Upon the initial polymerization of liquid polyunsaturated esters or solutions thereof, in suitable solvents, an increase in the viscosity of the liquids is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing substantial portions of polymers which are insoluble in the monomer and organic solvents, and containing as well, a substantial portion of soluble material which may be monomer and/or soluble fusible polymer. These gels are soft and bend readily. However, they are fragile and crumble or tear under low stresses. They may be further polymerized in the presence of catalysts to the final infusible insoluble state in which substantially all of the polymer is infusible and insoluble in organic solvents, acids, and alkalies.

The monomers of the polyunsaturated esters may be cast polymerized directly to the insoluble, infusible state. This procedure is subject to certain inherent difficulties due to the reduction in volume during the polymerization. The loss of volume or shrinkage causes strains to be established in the hardening gel which frequently result in fractures as the final hard form is attained. It has been discovered that these difficulties may be avoided by releasing the strains established in the gel. This may be done by permitting the strains to be relieved before the polymerization is complete, or by conducting polymerization under conditions which permit gradual release of these strains. For example, the polymerization may be conducted in a simple mold until a soft firm gel has formed. At this point the polymer may be freed from the mold to which it adheres strongly. When released, the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the complete decomposition of the peroxide catalyst. This temperature is dependent upon the catalyst used. For benzoyl peroxide, temperatures of 65 to 80° C. are suitable, while for acetone peroxide, temperatures of 140–150° C. may be used. The soft sheet of gel is then freed of the mold and in accordance with one modification the gel may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air which inhibits polymerization in the presence of benzoyl peroxide catalyst. Thus, a sheet is produced which is hard and smooth on one side while being soft and tacky on the other. The sheet may then be finished by coating the tacky side with monomer or syrupy polymer and polymerizing it in contact with a smooth plate to the insoluble, infusible state. Often it is found desirable to release the polymer from the plate one or more times during polymerization of the coating in order to minimize formation of cracks or other surface defects.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel. This may be accomplished by cooling, by removal from exposure to ultraviolet light, by adding inhibiting materials such as pyrogallol, hydroquinone, aniline, phenylene diamine, or sulphur or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. Alternatively, it may also be separated from the monomer by distillation in the presence of an inhibitor for polymerization and preferably at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the fusible polymers of the new esters are produced by heating the monomer or a solution thereof in the presence of 2 to 5 percent of benzoyl peroxide until the viscosity of the solution has increased about 100 to 500 percent. This may require from one-half to two hours while heating at 65-86° C. in the presence of benzoyl peroxide. The resulting viscous solution is poured into an equal volume of water, methyl or ethyl alcohol, glycol or other nonsolvent for the fusible polymer. A polymer usually in the form of a powder or a gummy precipitate is thus formed which may be filtered and dried. This permits substantially complete separation of a soluble fusible polymer from unpolymerized monomer.

Often, however, such complete separation may not be desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain at least 40 percent and preferably in excess of 50 percent fusible polymer but may contain from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial proportion of fusible polymer may be digested with a quantity of solvent for the fusible polymer to extract the fusible gel from the infusible. The solution may then be treated as above described to separate the fusible polymer from the solvent. These polymers may be used as moldings or coating compositions. Due to their solubility they are particularly desirable for use in paint compositions.

Other fusible polymers may be prepared by carrying the initial polymerization to the point where the polymer is in the form of a gel which generally contain at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohol, polyallyl alcohol, etc., and then polymerizing to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of 1 to 5 percent of benzoyl peroxide, generally in a heated mold. The polymers may be mixed with fillers such as alpha cellulose, wood pulp and other fibrous substances, mineral fillers or pigments such as zinc oxide or calcium carbonate, lead chromate, magnesium carbonate, calcium silicate, etc.; plasticizers such as the saturated alcohol esters of phthalic acid, camphor, the saturated alcohol esters of maleic, fumaric, succinic, and adipic acids or di- or triethylene glycol bis (butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tetrachloride, phenyl Cellosolve, dichlorethyl ether, dibutyl phthalate, or mixtures thereof is useful as a liquid coating composition. Objects of paper, metal, wood, cloth, leather or synthetic resins may be coated with the solution of polymer in solvent and subsequently polymerized to yield attractively finished coatings. Similarly, porous objects of felt, cloth, leather, paper, etc., either in single layers or laminated may be impregnated with the dissolved fusible polymer and subjected to the polymerization to the final infusible, insoluble state.

The following examples are illustrative:

*Example I*

A mixture of 250 gms. of glycol monomethacrylate, 200 gms. of pyridine, and 500 cc. of toluene was cooled to approximately 0° C. on an ice bath. Allyl chloroformate (235 gms.) was added slowly at a rate of about 3 to 4 grams per minute while constantly agitating the reaction mass. During the reaction the temperature remained between +2 and +13° C. When the reaction was complete the mass was permitted to stand at room temperature for an hour. The toluene solution was washed with dilute hydrochloric acid solution, then with aqueous sodium carbonate solution and finally with water. The toluene was evaporated by heating under reduced pressure and the product was dried over anhydrous sodium sulphate. The resulting ester had the composition:

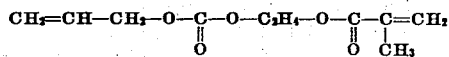

The ester readily polymerized upon heating with 2 percent benzoyl peroxide at 80° C. for one hour.

*Example II*

A mixture of 146 gms. of glycerol alpha monoacrylate and 500 cc. of benzene was cooled to 0° C. Phosgene was bubbled through the solution at the rate of 35 millimoles per minute for one hour. The reaction temperature remained below +8° C. by means of a bath of an ice-salt mixture. When the reaction was complete the solution was warmed slightly to evolve the excess phosgene. The benzene solution of the chloroformate was then washed with water and dried over sodium sulphate. A quantity of allyl alcohol slightly in excess of two moles (120 gms.)

was mixed with a substantial excess of pyridine (200 gms.). The chloroformate solution was added slowly to the pyridine-alcohol mixture over a period of one hour while maintaining the temperature below 10° C. by artificial cooling. The benzene solution was washed with water to free it of unreacted alcohol. The benzene was evaporated by heating the solution under reduced total pressure. The ester was believed to have the structure:

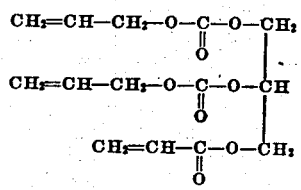

Example III

Equal molar quantities of alpha-hydroxybutyric acid (100 g.) and acrylic acid (70 gms.) were esterified by heating for two hours at 80–85° C. in the presence of 1 gram of p-toluene-sulphonic acid and 1 gram of hydroquinone. When the reaction was substantially complete the crude ester was diluted with 200 cc. ether and cooled. Ethylene oxide was bubbled through the reaction flask at a rate of approximately 1 gram per minute. After an hour the addition was discontinued and the ester freed of volatile impurities by heating at 2 mm. total pressure.

The ester was mixed with 80 gms. of pyridine and cooled to approximately 0° C. 60 gms. of allyl chloroformate were then slowly added at a rate just sufficient to permit the continual maintenance of the reaction temperature below 10° C. The resulting ester was washed with dilute HCl and water. It was freed of volatile impurities by heating for 10 minutes at 85–90° C. at 5–10 mm. total pressure. The ester was believed to have the structure:

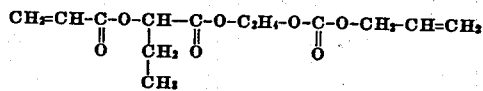

The ester was polymerized readily in the presence of 4 percent benzoyl peroxide at 80° C. to form a hard brittle solid.

Example IV

Equal molar quantities of trimethylene glycol (76 gms.) alpha chloracrylic acid (107 gms.) and 1 gm. of hydroquinone were dissolved in 500 cc. of benzol and the mixture refluxed for 4 hours, removing H2O as an azeotropic mixture. The resulting solution of an hydroxy ester was washed with two 50 cc. portions of water and dried over sodium sulphate. The benzol solution was then cooled to 0° C. and 100 gms. of pyridine were added, 255 gms. of the chloroformate of methallyl salicylate were added gradually at a rate which permitted the reaction temperature to remain below 10° C. throughout. The addition was dropwise at first but as the reaction proceeded a more rapid addition was possible. When the addition was completed the mixture was permitted to stand overnight at room temperature. The crude ester was washed with water and the benzol was evaporated at reduced pressure. The ester had the structure:

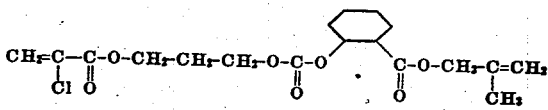

Example V

Triethylene glycol monochloracrylate was prepared by direct esterification of triethylene glycol (150 gms.) and alpha-chloracrylic acid (107 gms.). The ester was diluted with ether and washed with HCl and water. It was then dried over anhydrous sodium sulphate and the ether evaporated by gentle heating. The triethylene glycol monochloracrylate was then mixed with 90 gms. of lactic acid and the heating (50–60° C.) was continued for two hours in the presence of an additional 2 gms. of hydroquinone. The ester was washed with salt solution and purified by heating at 2 mm. total pressure. The resulting hydroxy ester was mixed with 500 cc. benzol and 100 gms. of pyridine. Approximately 110 gms. of crotyl chloroformate were added slowly while maintaining the temperature between +2 and +8° C. The crotyl chloroformate had been previously prepared by reacting crotyl alcohol with phosgene. The benzene solution was washed with water and dried. The ester was separated from the benzene by heating at reduced pressure. The structure of the ester was believed to be:

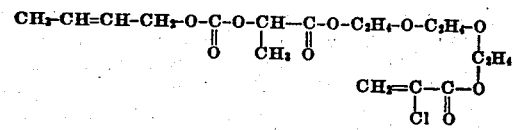

Example VI

Equal molar quantities of ethylene glycol and methacrylic acid were esterified by heating in the presence of one-half of one percent pyrogallol. The ester was purified by vacuum distillation. 130 gms. of the resulting glycol monomethacrylate was mixed with 500 cc. of benzene and saturated with phosgene at 10° C. The benzene solution of the chloroformate of ethylene glycol methacrylate was washed with water and dried over anhydrous sodium sulphate. This solution was then added slowly to a mixture of 100 gms. of pyridine and 125 gms. of allyl lactate. The rate of addition was so controlled that the reaction temperature remained between +5 and +9° C. throughout the entire reaction. When the addition was completed the mixture was washed with Na2CO3 solution and with water. The benzene was removed by heating gently at 2 mm. total pressure. The ester was believed to have the structure:

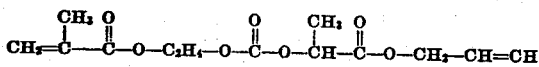

Example VII

One mole (160 gms.) of diethylene glycol monoacrylate, made by direct esterification in the presence of a polymerization inhibitor was reacted with an equal molar quantity of phosgene at a temperature below 15° C. to produce the chloroformate. In a separate vessel a 70 gm. sample of glycolic acid was esterified with methallyl alcohol by heating for ten hours at 80° C. with 1 gm. of hydroquinone. The methallyl glycolate was distilled at reduced pressures. 100 gms. of pyridine was added and the mixture cooled to 0° C. on an ice bath. The chloroformate was then added at the rate of 3 to 4 gms. per minute. The reaction temperature remained below 18° C. throughout the reaction. The unsaturated ester was washed with dilute HCl and water and dried over anhydrous Na₂SO₄. It was found to have the molecular constitution:

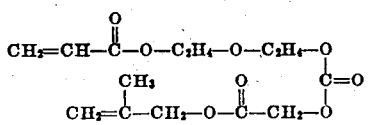

Example VIII

An excess of phosgene was bubbled through a solution of 150 gms. of methallyl lactate in 1000 cc. benzene. The temperature of reaction was maintained between +5 and +12° C. by cooling the reaction flask in an ice bath. The solution of the chloroformate of methallyl lactate was washed with water and dried. The benzene solution was then added slowly with continuous stirring to a cooled mixture of 100 gms. of pyridine and 150 gms. of propylene glycol monomethacrylate. The rate of addition was controlled so as to keep the reaction temperature below 10° C. The reaction vessel was submerged in an ice bath throughout the entire reaction. The ester was washed with water and dried over Na₂SO₄. The benzene was removed by heating in a vacuum. The molecular structure was believed to be as follows:

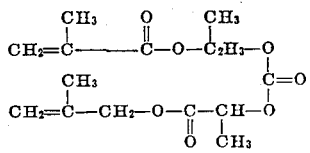

Example IX

Sixty-two grams of ethylene glycol and 86 gms. of methacrylic acid were reacted by heating with 1000 cc. of benzene at the reflux temperature for 10 hours. Two grams of hydroquinone were present to inhibit the polymerization. The benzene was evaporated and the ester separated by fractional distillation. The solution was mixed with 100 gms. of pyridine and cooled to 0° C. While maintaining the temperature below 8° C., 115 gms. of allyl chloroformate were added at a rate of 2 gms. per minute. The ester was washed with water and separated from the benzene by distillation. It had the structure:

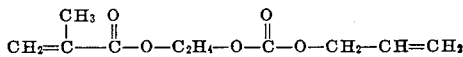

Example X

The monomethacrylate of diethylene glycol was prepared by reaction of methacrylic acid and diethylene glycol in equimolecular quantities by heating at 80° C. in the presence of one per cent of pyrogallol. The partial ester was distilled at reduced pressures. 175 gms. of this methacrylate was dissolved in 1000 cc. of benzene and cooled to −5° C. with an acetone-dry ice mixture. The solution was saturated with phosgene by bubbling the phosgene through at a rate of 30 millimoles per minute. The temperature remained below +5° C. throughout the reaction. When the reaction was completed the excess phosgene was distilled off by warming gently. The chloroformate was then added slowly to 70 gms. of methallyl alcohol while the mixture was maintained between 5 and 15° C. by means of the cooling mixture. The ester was purified by washing with water and distilling to remove the benzol. The ester was believed to have the structure:

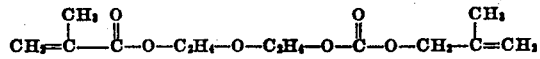

Example XI

One mole of propylene glycol monoacrylate (140 gms.) and 100 gms. of pyridine were dissolved in 1000 cc. of benzol and cooled to approximately 0° C. in an ice-salt mixture. The reaction mixture was stirred continuously and while maintaining a temperature below 10° C., 94 gms. of allyl chloroformate were added at a rate of 2 gms. per minute. When half of the chloroformate had been added the rate of addition was increased to 4 gms. per minute. The reaction mixture was permitted to stand for one hour after the addition had been completed. The benzene solution was washed with dilute HCl and water and dried over Na₂SO₄. The ester was separated from the benzene by distillation. The ester had the structure:

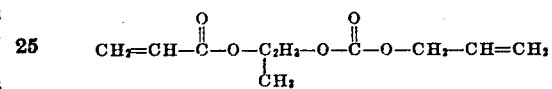

Although the invention has been described with respect to certain specific details, it is not intended that such details shall be limitations upon the scope of the invention except as incorporated in the following claims.

This case is a continuation-in-part of Serial No. 361,280, filed October 15, 1940, by Irving E. Muskat and Franklin Strain, and Serial No. 409,692, filed September 5, 1941, by Irving E. Muskat and Franklin Strain.

We claim:
1. The carbonate of allyl lactate and ethylene glycol monomethacrylate.
2. An ester of ethylene glycol monomethacrylate and allyl acid carbonate.
3. An ester of diethylene glycol monoacrylate and methallyl acid carbonate.
4. A polymer of the compound defined in claim 2.
5. A polymer of the compound defined in claim 3.
6. A polymer of the compound defined in claim 1.
7. A compound having the structural formula:

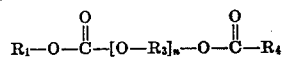

in which R₁ is a radical selected from the group consisting of [R₂]— and

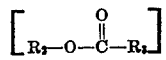

R₂ is an alkenyl radical having an olefinic bond between the second and third carbon atoms from the ester

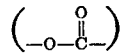

group, R₃ is an alkylene radical, R₄ is an alkenyl radical having an olefinic bond between the first and second carbon atoms from the carbonyl radical, and n equals a small whole number.

8. A compound having the structural formula:

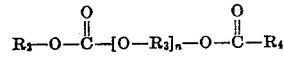

wherein R₂ is an alkenyl radical having an olefinic bond between the second and third carbon atoms from the ester
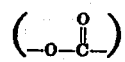
group, $R_3$ is an alkylene radical, $R_4$ is an alkenyl radical having an olefinic bond between the first and second carbon atoms from the carbonyl radical, and $n$ equals a small whole number.
9. A polymer of the compound defined in claim 7.
IRVING E. MUSKAT.
FRANKLIN STRAIN.